Nov. 20, 1923. 1,474,352

M. FOLKMAN

FASTENER FOR CUFF BUTTONS, ETC

Filed May 7, 1923

Inventor

Morris Folkman

Patented Nov. 20, 1923.

1,474,352

UNITED STATES PATENT OFFICE.

MORRIS FOLKMAN, OF CLEVELAND, OHIO, ASSIGNOR OF ONE-HALF TO FRANK J. CHALUS, OF CLEVELAND, OHIO.

FASTENER FOR CUFF BUTTONS, ETC.

Application filed May 7, 1923. Serial No. 637,268.

*To all whom it may concern:*

Be it known that I, MORRIS FOLKMAN, a citizen of the United States, residing at Cleveland, in the county of Cuyahoga and State of Ohio, have invented certain new and useful Improvements in Fasteners for Cuff Buttons, Etc., of which the following is a specification.

This invention relates to fasteners for cuff buttons, separable buttons, and similar articles, and has for its object to provide an improved construction by means of which the two members of a link button or the like will be securely held together, but can be fastened or unfastened by a slight twist or turning movement of one part with respect to the other part, a latch or lock being effected by means of projections carried by the connecting rod or stem between the members, which projections engage in a keeper mounted on one of the members.

Figure 1:
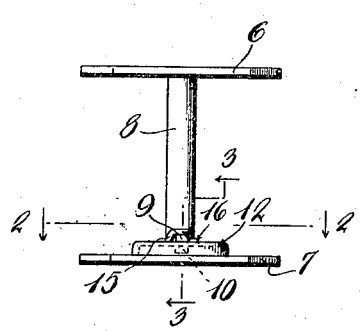
Figure 2:
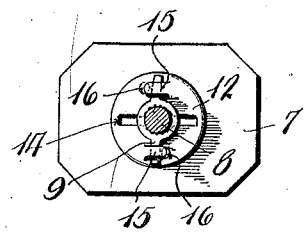
Figure 3:
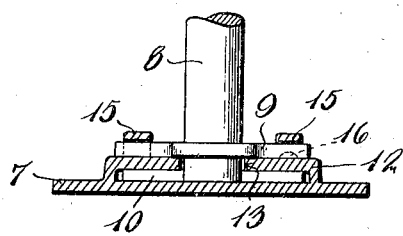
Figure 4:
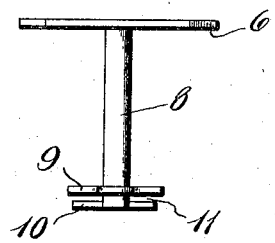

The invention will be more fully understood from the following description and the accompanying drawings in which Fig. 1 is a side elevation of a cuff button provided with the improvement. Fig 2 is a section on the line 2—2 of Fig. 1. Fig. 3 is a section on the line 3—3 of Fig. 1. Fig. 4 is a side view of one of the members and the connecting stem.

In the drawings, 6 indicates one plate or head of the button and 7 the other. The head 6 has rigid therewith a rod or stem 8 the free end of which is provided at each side with a pair of fingers or projections 9 and 10, which are spaced apart as indicated at 11.

The other head or member 7 has on its inner surface a circular socket piece 12 which is recessed or hollow, and has at the center an opening 13 provided with radial slots 14 extending oppositely therefrom. Also the face or outer surface of the socket 12 has a pair of spring tongues 15 secured thereto and bent to form catches, and under the point or end of each tongue the part 12 has a boss or small knob 16. These tongues 15 are arranged on a diametrical line at a right angle to that of the slot 14.

The fingers 10 are of such size that they may be turned within the socket and the fingers 9 are of such size that they may be entered, with slight or special pressure, under the hook tongues 15 on the outer side of the socket.

To fasten the members of the button together, the end of the stem 8 is placed in the hole 13, the fingers 10 passing through the slots 14. Then the members are given a quarter turn with respect to each other, at which time the fingers 10 will turn under the solid part of the socket, out of register with the slots 14, and the fingers 9 will at the same time snap over the bosses 16 and under the tongues 15, the latter yielding sufficiently to permit the snap action. When thus assembled, the parts will be quite securely fastened together, and cannot be pulled apart except by a reverse quarter turn to register the fingers 10 with the slots 14. Accidental turning movement is prevented by the engagement of the fingers 9 under the tongues 15 and behind the bosses 16, special effort being required to snap the fingers 9 over the bosses 16. It will be noticed, also, that the fingers 15 do not stand outward strain tending to pull the members apart, but the same is taken by the arms 10 engaging under the solid part of the socket 12.

The device will be found quite convenient and useful for the purposes suggested, or for other similar purposes, and no limitation in this respect is to be understood.

I claim:

1. A separable button comprising two members one of which is provided with a socket and the other with a stem, the socket having a radial slot and a catch on the outside of the socket, and the stem having a pair of arms one of which may be entered through the slot and the other of which is engageable with the catch, said arms being engaged by turning the members with respect to each other.

2. A separable fastener comprising two heads one having a socket with a central hole and slot extending therefrom, and an external catch on the socket, and the other having a stem adapted to be inserted in said hole and having a projecting finger adapted to be entered through said slot, and also having another projecting finger engageable with the catch by turning the stem.

3. A separable fastener comprising two members one of which is provied with a socket having radial slots extending therefrom and spring catches at an angle to said slots, and the other member having a stem fitting in the socket, the stem having an outer pair of fingers adapted to be entered into the socket through said slots and another pair of fingers adapted to engage the catches by turning the members with respect to each other.

In testimony whereof, I affix my signature in presence of two witnesses.

MORRIS FOLKMAN.

Witnesses:
 JOHN A. BOMMHARDT,
 BESSIE F. POLLAK.